United States Patent
Cross et al.

(10) Patent No.: US 6,681,244 B1
(45) Date of Patent: Jan. 20, 2004

(54) SYSTEM AND METHOD FOR OPERATING A NETWORK ADAPTER WHEN AN ASSOCIATED NETWORK COMPUTING SYSTEM IS IN A LOW-POWER STATE

(75) Inventors: Patricia C. Cross, Westborough, MA (US); Glenn W. Connery, Petaluma, CA (US); Christopher J. Duguay, Winchendon, MA (US)

(73) Assignee: 3Com Corporation, Santa Clara, CA (US)

( * ) Notice: Subject to any disclaimer, the term of this patent is extended or adjusted under 35 U.S.C. 154(b) by 635 days.

(21) Appl. No.: 09/591,579

(22) Filed: Jun. 9, 2000

(51) Int. Cl.[7] ............................................. G06F 15/16
(52) U.S. Cl. ..................................................... 709/203
(58) Field of Search ................................. 709/203, 223

(56) References Cited

U.S. PATENT DOCUMENTS 5,117,500 A  *  5/1992  Davis et al. ................ 709/230
5,742,833 A  *  4/1998  Dea et al. ................... 709/224
6,493,824 B1  *  12/2002  Novoa et al. ............... 713/162

* cited by examiner

*Primary Examiner*—David Y. Eng
(74) *Attorney, Agent, or Firm*—Weingarten, Schurgin, Gagnebin & Lebovici LLP (57) ABSTRACT

A system for operating a network interface adapter when an associated network computing system is in a low-power state. The system includes a host executing an operating system (OS) and having a host OS absent state while operating in the low-power state and a host OS present state while operating in a full-power state. When a message is received at the network interface adapter, the network adapter determines whether the host is in the OS present state or the OS absent state. The network adapter forwards the message to the host if it is in the OS present state, and determines the message type if the host is in the OS absent state. The network adapter may generate and transmit a response to the message based on the message type without unnecessarily transitioning the host to the OS present state.

10 Claims, 4 Drawing Sheets

SYSTEM AND METHOD FOR OPERATING A NETWORK ADAPTER WHEN AN ASSOCIATED NETWORK COMPUTING SYSTEM IS IN A LOW-POWER STATE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to network computing systems, and more specifically to systems and techniques for operating a network adapter when an associated network computing system is in a low-power state.

In recent years, power management applications have been increasingly used in computers and other computerized devices to conserve or otherwise manage the power that they consume. Although power management applications have traditionally been used in battery-powered, portable computers, the proliferation of AC-powered, desktop computers throughout the world has provided strong incentives to use such power management applications in these computers as well.

In a typical power management scheme, a computer or at least a certain number of components incorporated therein is powered-down when the computer is not in use for an extended time. A computer or sub-system in this condition may be referred to as operating in a "low-power state" or a "sleep state." Full power is then restored to the computer when it is required for use. A computer in this alternate condition may be referred to as operating in a "full-power state." For example, a computer in the low-power state may be in a "suspended power state," in which all power is removed from the computer except for that required to maintain data stored in memory and to refresh DRAMs. Alternatively, a computer in the low-power state may be in a "hibernated power state," in which data stored in memory is written to disk before power is removed from the computer. In both the suspended power state and the hibernated power state, a computing system typically saves its current operational state. In contrast, a computing system typically loses its current operational state in a general power-down condition.

Although such power management schemes have greatly enhanced the energy efficiency of computers and other computerized devices, current power management techniques have drawbacks in that they are not easily adapted for use in network computing systems. For example, a computer connected to a network typically monitors the network for data packets. If the computer detects a data packet, then it generally either rejects the data packet or accepts and processes the data packet. A computer normally rejects data packets that are not addressed to that computer, and accepts and processes data packets that are addressed to the computer. However, if the computer implements a power management application that causes it to enter the low-power state after a period of non-use, then that computer in the low-power state may be incapable of monitoring the network for data packets. As a result, data packets that are addressed to that computer may go undetected and be inadvertently lost.

Not only may data packets be inadvertently lost on the network, but the computer in the low-power state may also lose its communications link to the network. For example, a computer connected to a network that uses the Internet Protocol ("IP network") is typically identified by its Internet Protocol address (IP address). Further, IP addresses within IP networks are frequently assigned to computers using the Dynamic Host Configuration Protocol (DHCP). A characteristic of DHCP is that an IP address is assigned or "leased" to a computer for only a fixed time interval. Accordingly, that computer is responsible for periodically renewing the lease of its IP address. However, if the computer implements a power management application and enters the low-power state after a period of non-use, then that computer may be incapable of renewing its lease within the lease period. As a result, the computer in the low-power state may inadvertently lose both its current IP address and its communications link to the network.

It would therefore be desirable to have improved systems and techniques for operating network computing systems that implement power management applications. Such systems and techniques would enable a networked computer to receive and process data packets even when the computer is in the low-power state. It would also be desirable to have systems and techniques for renewing leases of IP addresses when a networked computer is in the low-power state.

BRIEF SUMMARY OF THE INVENTION

In accordance with the present invention, a system and method are disclosed for operating a network adapter when an associated network computing system is in a low-power state. Specifically, the disclosed system and method enable a network computing system in the low-power state to receive messages over the network communications link and to transmit responses thereto. Such receipt and transmission of messages and responses over the network is accomplished by maintaining power to a network interface adapter of a host network computing system when the host system is in the low-power state. The network interface adapter includes a processor that is capable of determining whether or not the host system is in the low-power state, and receiving messages over the network and transmitting responses thereto without requiring the host system to transition from the low-power state to a full-power state.

In one embodiment, a system is provided for responding to at least one predetermined message received over a communications link at a network interface of a network interface adapter. The network interface adapter is communicably coupled to a host computer, which includes a host processor executing an operating system out of a memory. The host processor has a host operating system present state in which the operating system is operational, and a host operating system absent state in which the host operating system is not operational. The system further includes a network adapter processor that detects the receipt of the at least one predetermined message at the network interface. In response to the detection of the at least one predetermined message, the network adapter processor determines whether the host computer is in the host operating system present state or the host operating system absent state. In response to a determination that the host computer is in the host operating system absent state, the network adapter processor generates a response to the at least one predetermined message and transmits the response via the network interface over the communications link.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
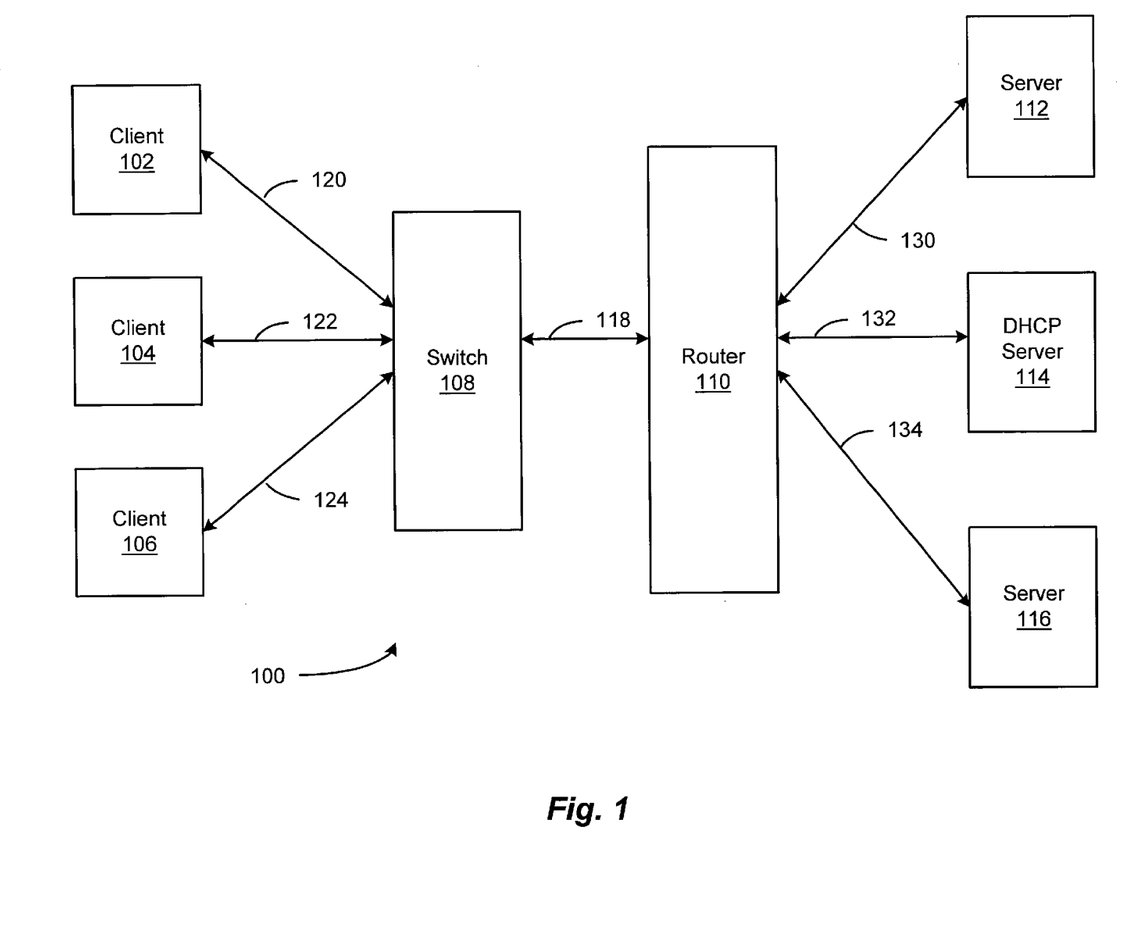
FIG. 1 is a block diagram illustrating a computer network operative in a manner according to the present invention.

FIG. 1 depicts an illustrative embodiment of a computer network 100 that is operative in a manner in accordance with the present invention. Specifically, the network 100 includes a plurality of client computers ("clients") 102, 104, and 106 operatively connected to a switch 108 by way of respective network segments 120, 122, and 124. Each of the clients 102, 104, and 106 may comprise a Personal Computer (PC) or any other computerized device communicably connectable to a network. Further, the switch 108 is a conventional "desktop switch" or "hub switch" that enables data communications between the clients 102, 104, and 106 and with remote computers on the network 100.

The network 100 also includes a plurality of conventional server computers ("servers") 112, 114, and 116 operatively connected to a conventional router 110 by way of respective network segments 130, 132, and 134. In this illustrative embodiment, the server 114 is a DHCP server that implements the Dynamic Host Configuration Protocol (DHCP) as defined in Internet RFC 2131 and Internet RFC 2132, both of which are incorporated herein by reference. The structure and operation of the DHCP server 114 will be described in detail later in this specification.

As depicted in FIG. 1, a network segment 118 operatively interconnects the switch 108 and the router 110. Further, each network segment 118, 120, 122, 124, 130, 132, and 134 may comprise lengths of contiguous wire, optical fiber, or coaxial cable suitable for communicably connecting the clients 102, 104, and 106 to the switch 108; the servers 112, 114, and 116 to the router 110; and, the switch 108 to the router 110. Still further, the network 100 supports at least one transport protocol.

Figure 2:
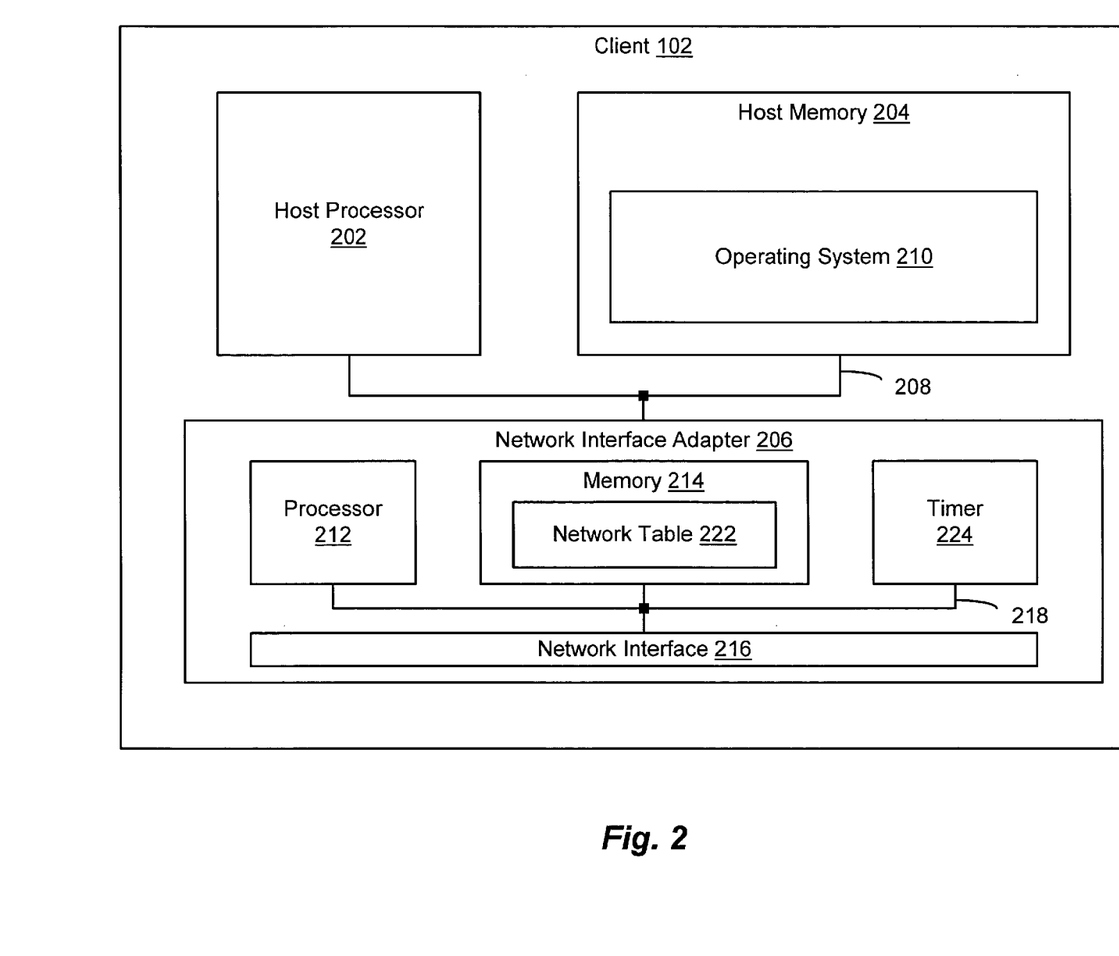
FIG. 2 is a block diagram illustrating a client computer of the type depicted in FIG. 1, and operative according to the present invention.

FIG. 2 is a block diagram of the client 102. In this illustrative embodiment, the structure of the client 102 is representative of the structure of each of the clients 102, 104, and 106 depicted in FIG. 1. Specifically, the client 102 includes a network interface adapter 206, which in a preferred embodiment is implemented on at least one network interface card (NIC) of the client 102. Alternatively, the network adapter 206 may be integrated with host logic.

More specifically, the network adapter 206 includes a network interface 216, which comprises conventional circuitry and connectors to provide for coupling the network adapter 206 to the network segment 120. The network adapter 206 further includes at least one memory 214 such as a ROM and/or a RAM, and at least one processor 212 for executing programs stored in the memory 214, including applications for establishing a communications link with the network 100, for transmitting and receiving data packets over the network 100, and for processing the data packets. The memory 214 includes a network table 222 (also known as an "ARP cache"), which will be described in detail later in this specification. Further, the network adapter 206 includes a conventional timer 224, which will also be described in detail later in this specification. A bus 218 communicably interconnects the processor 212, the memory 214, the timer 224, and the network interface 216 of the network adapter 206.

The client 102 further comprises at least one host memory 204 such as a ROM and/or a RAM, and at least one host processor 202 for executing an operating system (OS) 210 and application programs stored in the memory 204. In this illustrative embodiment, the application programs stored in the memory 214 include a power management application for powering-down at least a portion of the client 102, e.g., when the client 102 is not in use for an extended time, and for restoring full-power to the client 102 when it is required for use. The operation of the OS 210 in relation to the power management application will be described in detail later in this specification. Further, as depicted in FIG. 2, a system bus 208 communicably interconnects the host processor 202, the host memory 204, and the network adapter 206.

It should be understood that the client 102 includes other conventional computer components that are not explicitly depicted in FIG. 2. For example, those of ordinary skill in the art will appreciate that the client 102 includes conventional components such an interrupt controller, an I/O controller, and a direct memory access (DMA) controller. It should further be appreciated that the system bus 208 comprises conventional data, address, and control busses required for communicably interconnecting the host processor 202 and the network adapter processor 212 with these conventional components.

As mentioned above, the network adapter 206 implemented on the NIC of the client 102 provides a communications link to the network segment 120. Specifically, the network adapter 206 has a physical address known as a "machine address" (also known as a "destination address" or a "Media Access Control (MAC) address") that allows the client 102 to be directly addressed by any other computer on the network 100. For example, the machine address of the network adapter 206 may be expressed as twelve (12) hexadecimal digits (e.g., 00AB00CD1234).

Further, the client 102 has a logical address that corresponds with, e.g., a user's name or a machine location. For example, the network 100 may comprise an IP network and the logical address of the client 102 may be expressed as an IP address. Accordingly, when a message including at least one data packet is transmitted to the client 102 from another computer on the network 100 using the IP address of the client 102, the transport protocol of the network 100 (e.g., the TCP/IP transport protocol) converts the IP address of the client 102 into the machine address of the network adapter 206 to establish a communications link between the two (2) computers. The machine address and the IP address corresponding thereto may be stored in the network table 222 of the network adapter memory 214.

Those of ordinary skill in the art will appreciate that there are three (3) types of data packets, i.e., "directed packets," "broadcast packets," and "multicast packets." Specifically, directed packets comprise data packets that are addressed to a specific computer on a network; broadcast packets comprise data packets that are addressed to every computer on a network; and, multicast packets comprise data packets that are addressed to more than one, but not all, computers on a network.

For example, an "echo request message" (also known as a "ping request message") and an "echo reply message"

(also known as a "ping reply message") defined according to the Internet Control Message Protocol (ICMP) are directed packets. Accordingly, one of the computers 102, 104, 106, 112, 114, and 116 on the network 100 may directly address an echo request message to any other computer on the network 100 to determine whether that computer is reachable and responding. If so, then that computer replies to the echo request message by directly addressing an echo reply message to the computer that sent the request. Techniques for detecting and responding to echo request messages are described in Internet RFC 792, which is incorporated herein by reference.

In addition, an "Address Resolution Protocol (ARP) request message" and an "ARP reply message" are examples of conventional broadcast packets. Accordingly, any one of the computers 102, 104, 106, 112, 114, and 116 may broadcast an ARP request message to all of the other computers on the network 100 to determine the machine address corresponding to a particular IP address. If one of the computers 102, 104, 106, 112, 114, and 116 has the requested information stored in its network table, then that computer replies to the ARP request message by broadcasting an ARP reply message including the requested information to all of the other computers on the network 100. Techniques for detecting and responding to ARP request messages are described in Internet RFC 826, which is incorporated herein by reference. The computers 102, 104, 106, 112, 114, and 116 may then store that information, i.e., the machine address and the IP address corresponding thereto for a particular computer on the network 100, in their respective network tables.

As also mentioned above, the client 102 is used in power management applications, e.g., to power-down at least a portion of the client 102 when it is not in use for an extended period of time and to restore full-power to the client 102 when it is required for use. In an alternative embodiment, the user of the client 102 manually initiates execution of the power management application by, e.g., pushing a button, making a menu selection, or closing a lid of the computer. In another alternative embodiment, the power management application is used to configure the network adapter 206 to wake the client 102 either at a predetermined time or a predetermined time interval after the client 102 went to sleep. In these exemplary ways, the energy efficiency of the client 102 can be enhanced.

In this illustrative embodiment, each client 102, 104, and 106 can continuously receive data packets over the network 100, e.g., echo request messages and ARP request messages; process the data packets; and, transmit appropriate replies thereto, e.g., echo reply messages and ARP reply messages, over the network 100 whether or not the clients 102, 104, and 106 are in the full-power state (i.e., the computer is "awake") or the low-power state (i.e., the computer is "sleeping").

For example, when the client 102 is sleeping, it may be in the suspended power state in which all power is removed from the client 102 except for that required to maintain the current operational state in the memory 204; and, to maintain the operation of the network adapter processor 212, the network adapter memory 214, the timer 224, and the network interface 216. Further, the speed of the system clock of the client 102 may be reduced.

In this illustrative embodiment, when the client 102 is sleeping, the host processor 202 cannot execute the OS 210 stored in the memory 204. Accordingly, the host computer 202 has a "host OS absent state" when the client 102 is sleeping, and a "host OS present state" when the client 102 is awake. Moreover, the network adapter 206 wakes the client 102 by issuing a signal to the OS 210 using conventional techniques.

The embodiments disclosed herein will be better understood with reference to the following illustrative examples. In a first illustrative example, the switch 108 includes a respective network table for storing the machine address and the IP address corresponding thereto for each "active" client 102, 104, and 106. In this illustrative example, an active client is one that transmits data packets over the network 100 by way of the switch 108, with successive data packets being transmitted within a predetermined time interval, e.g., 60 seconds.

Accordingly, if the switch 108 does not detect a data packet from the client within the predetermined time interval of, e.g., 60 seconds, then the switch 108 does not regard that client as being active and therefore the switch 108 removes the machine address/IP address pair for that client from its respective network table. This may occur in conventional computer networks when the client is sleeping, i.e., when the client is in the OS absent state. As a result, the switch 108 is no longer capable of transmitting data packets, e.g., echo request messages and ARP request messages, received from other computers on the network 100 to that client because it cannot reference the client's machine address/IP address pair in its respective network table.

In order to prevent the switch 108 from removing the machine address and IP address of, e.g., the client 102 in the OS absent state from its respective network table, the network adapter 206 (which has at least selected circuitry powered when the client 102 is sleeping) periodically broadcasts a defined data packet type over the network 100. In a preferred embodiment, the network adapter 206 broadcasts a "machine address refresh frame" over the network 100 every 60 seconds.

Specifically, the machine address refresh frame is based on the Ethernet Configuration Testing Protocol, as described in Ethernet Version 2.0—November 1982, which is incorporated herein by reference. More specifically, the machine address refresh frame is a "reply frame" having both source and destination addresses set to the machine address of the network adapter of the host computer, which in this illustrative example is the client 102.

In a preferred embodiment, the reply frame is a minimum size data packet that includes the following fields:

| FIELD | SIZE | VALUE |
| --- | --- | --- |
| Destination Address | 6 bytes | Host's MAC Address |
| Source Address | 6 bytes | Host's MAC Address |
| Type Field | 2 bytes | 0 x 9000 |
| Skip Count | 2 bytes | 0 |
| Function | 2 bytes | 1 - Reply |
| Receipt Number | 2 bytes | Any 16 bit value |
| Data | 40 bytes | Any loop-back data |

The above-defined reply frame is stored in the network adapter memory 214, and the network adapter processor 212 executes a program stored in the memory 214 to broadcast the reply frame over the network 100, preferably every 60 seconds, when the client 102 is in the OS absent state.

Because the switch 108 receives the reply frame from the client 102 every 60 seconds, the switch 108 regards the client 102 as being active even though the client 102 is in the OS absent state, and therefore the switch 108 does not remove the machine address/IP address pair of the client 102 from its respective network table. As a result, the switch 108 is capable of transmitting data packets such as echo request messages and ARP request messages received from other computers on the network 100 to the client 102, even if the client 102 is sleeping for an extended time.

In a second illustrative example, the router 110 includes a respective network table for storing machine address/IP address pairs of computers on the network 100. Further, the router 110 receives a data packet including a destination IP address from one of the servers 112, 114, and 116. However, the router 110 does not have the machine address corresponding to the destination IP address stored in its respective network table.

For example, the data packet may be a remote wake frame or "magic packet" that includes the destination IP address repeated multiple times therein. Moreover, because the router 110 does not have the machine address corresponding to the destination IP address stored in its respective network table, the router 110 broadcasts an ARP request message to the clients 102, 104, and 106 to determine the corresponding machine address.

In this illustrative example, the destination IP address corresponds to the client 102, which is sleeping, i.e., the client 102 is in the OS absent state. However, because the client 102 in the OS absent state has sufficient network adapter circuitry powered including the network adapter processor 212, the network adapter memory 214, and the network interface 216, the network adapter 206 utilizes these components to receive the ARP request message and broadcast an ARP reply message to the router 110, which updates its respective network table with the machine address/IP address pair of the client 102. The router 110 then transmits the magic packet to the machine address of the network adapter 206, which wakes the client 102 by issuing a signal to the OS 210 using conventional techniques to place the client 102 in the OS present state.

Because the client 102 in the OS absent state has sufficient circuitry powered to maintain operation of the network adapter 206, the network adapter 206 is capable of receiving and responding to ARP request messages without waking the client 102. Accordingly, the network adapter 206 wakes the client 102 only when necessary, e.g., upon receipt of a magic packet.

In a third illustrative example, one of the computers on the network 100 directly transmits an echo request message to the client 102, which is sleeping, i.e., the client 102 is in the OS absent state. However, because the client 102 in the OS absent state has sufficient network adapter circuitry powered to maintain operation of the network adapter processor 212, the network adapter memory 214, and the network interface 216, the network adapter 206 utilizes these components to receive the echo request message and to transmit an echo reply message directly to the computer that sent the echo request message.

In a preferred embodiment, the network adapter 206 filters the received echo request message using conventional techniques. For example, the network adapter processor 212 may execute a program stored in the network adapter memory 214 to create a "comparison mask" for the echo request message and to use the comparison mask to filter out any irrelevant fields in the echo request message.

Because the client 102 in the OS absent state has sufficient power to maintain operation of the network adapter 206, the network adapter 206 is capable of receiving and responding to echo request messages without waking the client 102. Accordingly, the network adapter 206 wakes the client 102 only when necessary, e.g., upon the receipt of a remote wake frame such as a magic packet.

In a fourth illustrative example, the network adapter 206 is configured to wake the client 102 at the end of a predetermined time interval starting from the time that the client 102 went to sleep. In a preferred embodiment, the predetermined time interval is represented in milliseconds by a 32-bit number. Accordingly, the predetermined time interval has a maximum value of about 49 days.

For example, a user of the client 102 may enter the predetermined time interval by way of a user interface such as a keyboard and a display monitor. It should be understood that the predetermined time interval may alternatively be entered by a process executing on the client 102. Further, the network adapter processor 212 executes a program stored in the memory 214 to store the entered time interval, i.e., the 32-bit number corresponding thereto, in the network adapter memory 214; to pass the entered time interval to the timer 224 by way of the bus 218; and, to direct the host processor 202 to put the client 102 to sleep, i.e., to place the client 102 in the OS absent state. As described above, the user of the client 102 may alternatively put the client 102 to sleep by, e.g., pushing a button, making a menu selection, or closing a lid of the computer.

In this illustrative example, the timer 224 is a conventional electronic timer capable of being controlled by the network adapter processor 212. For example, upon receipt of the entered time interval, the timer 224 may be controlled to keep track of the passage of time, and to issue a signal to the network adapter processor 212 after the entered time interval has elapsed. Upon receipt of the signal issued by the timer 224, the network adapter processor 212 wakes the client 102 by issuing a signal to the OS 210 using conventional techniques, thereby placing the client 102 in the OS present state.

In this illustrative example, the network adapter 206 may alternatively be configured to wake the client 102 at a predetermined time. Accordingly, in this alternative configuration, the timer 224 is a conventional clock-driven timer controlled by the network adapter processor 212.

For example, the user of the client 102 may enter the predetermined time by way of the user interface. Further, the network adapter processor 212 executes a program stored in the memory 214 to store the entered time in the network adapter memory 214; to pass the entered time to the clock-driven timer 224; and, to direct the host processor 202 to put the client 102 to sleep, i.e., to place the client 102 in the OS absent state. Upon receipt of the entered time, the timer 224 is controlled to issue a signal to the network adapter processor 212 precisely at that time. The network adapter processor 212 then wakes the client 102 by issuing a signal to the OS 210 using conventional techniques, thereby placing the client 102 in the OS present state.

Because network adapter 206 includes the timer 224, the network adapter 206 is capable of waking the client 102 either at the end of a predetermined time interval or at a predetermined time to enhance the energy efficiency of the client 102 and to provide added convenience for a user.

In a fifth illustrative example, one of the servers 112 and 116, e.g., the server 112, is a NOVELL™ server and at least one of the clients 102, 104, and 106, e.g., the client 102, is a NOVELL™ client (NOVELL™ is a trademark of Novell, Inc., Provo, Utah, USA). As described herein, the NOVELL™ server 112 and the NOVELL™ client 102 are conventional computerized devices executing a NOVELL™

Network Operating System from respective memories. In this illustrative example, an "active" NOVELL™ client is one that transmits a "response frame" upon receipt of a "poll frame" periodically transmitted by the NOVELL™ server (the response frame and the poll frame are consistent with NCP Watchdog Frames conventionally used by NOVELL™ servers and clients). Accordingly, if the NOVELL™ server 112 does not detect a response frame from the NOVELL™ client 102, then the NOVELL™ server 112 does not regard the NOVELL™ client 102 as being active and therefore terminates the communications link with the NOVELL™ client 102. This may occur in conventional computer networks when the NOVELL™ client 102 is sleeping, i.e., when the NOVELL™ client 102 is in the OS absent state.

In order to prevent the NOVELL™ server 112 from terminating its communications link with the NOVELL™ client 102, the network adapter 206 (to which power is maintained when the NOVELL™ client 102 is sleeping) monitors the network 100 for a poll frame transmitted by the NOVELL™ server 112, and creates and transmits a response frame over the network 100 in response thereto.

In a preferred embodiment, the poll frame is a data packet that includes the following fields:

| Destination Address | 6 bytes | Field A |
|---|---|---|
| Source Address | 6 bytes | Field B |
| Length Field | 2 bytes | 00h 20h |
| IPX Checksum | 2 bytes | FFh FFh |
| IPX Length | 2 bytes | 00h 20h |
| IPX Transport Control | 1 byte | Hop Count |
| IPX Packet Type | 1 byte | 04h (IPX) |
| IPX Destination Address | | |
| Destination Network | 4 bytes | Field C |
| Node Address | 6 bytes | Field D |
| Socket Number | 2 bytes | 40h 05h |
| IPX Source Address | | |
| Source Network | 4 bytes | Field E |
| Node Address | 6 bytes | Field F |
| Socket Number | 2 bytes | 40h XXh |
| NCP Connection Number | 1 byte | Field G |
| NCP Signature | 1 byte | 3Fh |

Further, the network adapter 206 preferably uses the IPX Checksum field, the IPX Packet Type field, the first and second Socket Number fields, and the NCP Signature field to filter the poll frame.

Moreover, in a preferred embodiment, the reply frame is a data packet that includes the following fields:

| Destination Address | 6 bytes | Field B from Request |
|---|---|---|
| Source Address | 6 bytes | Field A from Request |
| Length Field | 2 bytes | 00h 20h |
| IPX Checksum | 2 bytes | FFh FFh |
| IPX Length | 2 bytes | 00h 20h |
| IPX Transport Control | 1 byte | 00h |
| IPX Packet Type | 1 byte | 04h |
| IPX Destination Address | | |
| Destination Network | 4 bytes | Field E from Request |
| Node Address | 6 bytes | Field F from Request |
| Socket Number | 2 bytes | 40h 01h |
| IPX Source Address | | |
| Destination Address | 4 bytes | Field C from Request |
| Node Address | 6 bytes | Field D from Request |
| Socket Number | 2 bytes | 40h 05h |
| NCP Connection Number | 1 byte | Field G from Request |
| NCP Connection Active | 1 byte | 59h |

The above-defined reply frame is stored in the network adapter memory 214, and the network adapter processor 212 executes a program stored in the memory 214 to transmit the reply frame over the network 100 to the NOVELL™ server 112 in response to the above-defined poll frame when the NOVELL™ client 102 is in the OS absent state.

Because the NOVELL™ server 112 receives the reply frame from the NOVELL™ client 102 in response to the transmitted poll frame, the NOVELL™ server 112 regards the NOVELL™ client 102 as being active even though it is in the OS absent state and therefore the NOVELL™ server 112 does not terminate its communications link with the NOVELL™ client 102. As a result, the NOVELL™ client 102 is capable of maintaining the communications link with the NOVELL™ server 112, even if the NOVELL™ client 102 is sleeping for an extended time.

In a sixth illustrative example, the DHCP server 114 is a conventional computerized device used to allocate IP addresses within the network 100 using the DHCP protocol. In this illustrative example, the client 102 requests an IP address from the DHCP server 114; and, the DHCP server 114 allocates an IP address for use by the client 102 and transmits a message to the client 102 including an indication of the allocated IP address. The IP address allocated by the DHCP server 114 is leased to the client 102 for a fixed time interval, e.g., 24 hours. Accordingly, if the client 102 does not renew the lease of its IP address before that fixed time interval elapses, then the client 102 loses both its current IP address and its communications link to the network 100. This may occur in conventional computer networks when the client 102 is sleeping, i.e., when the client 102 is in the OS absent state.

In order to prevent the client 102 from losing its IP address and its communications link to the network 100, the network adapter 206 (to which power is maintained to selected circuitry when the client 102 is sleeping) periodically renews the lease of the IP address of the client 102. Specifically, the network adapter processor 212 executes a program stored in the network adapter memory 214 to broadcast a DHCPREQUEST message over the network 100 for renewal of the existing lease, and to receive, e.g., DHCPNACK and DHCPACK messages that may be transmitted by the DHCP server 114 in response to the DCHPREQUEST message.

More specifically, the DHCP server 114 receives the DHCPREQUEST message and extracts a lease identifier therefrom. Next, the DHCP server 114 uses the lease identifier to search for a record in a lease database included in the DHCP server 114. If a record cannot be found in the lease database that matches the lease identifier, then the DHCP server 114 transmits the DHCPNACK message to the network adapter 206 of the client 102 indicating that the DHCP server 114 is unable to satisfy the request to renew the existing lease. For example, the DHCP server 114 may transmit the DHCPNACK message if the client 102 attempted to renew a nonexistent or invalid lease. If the network adapter 206 receives the DHCPNACK message from the DHCP server 114, then the network adapter 206 wakes the client 102 by issuing a signal to the OS 210 using conventional techniques, thereby allowing the host processor 202 to attempt to resolve the problem. Alternatively, if the matching record is found in the lease database, then the DHCP server 114 retrieves that record from the lease database and determines whether or not the lease included in the retrieved record has expired. If so, then the DHCP server 114 transmits the DHCPNACK message to the network adapter 206, which wakes the client 102 in the manner described above in an attempt to resolve the problem. Otherwise, the DHCP server 114 updates the lease database to indicate that the lease included in the retrieved record has been renewed by the client 102, and transmits the DCHPACK message to the network adapter 206 to inform the client 102 that the IP address lease has been successfully renewed. It should be understood that if the network adapter 206 receives the DHCPACK message from the DHCP server 114 in response to the DHCPREQUEST message, then no problems are encountered in renewing the IP address lease and therefore the network adapter 206 does not wake the client 102 at this time.

Because the client 102 in the OS absent state has sufficient circuitry powered to maintain operation of the network adapter 206, the network adapter 206 is capable of renewing the IP address lease of the client 102 without waking the client 102. As a result, the client 102 is capable of maintaining its IP address and its communications link to the network 100, even if the client 102 is sleeping for an extended time.

Figure 3:
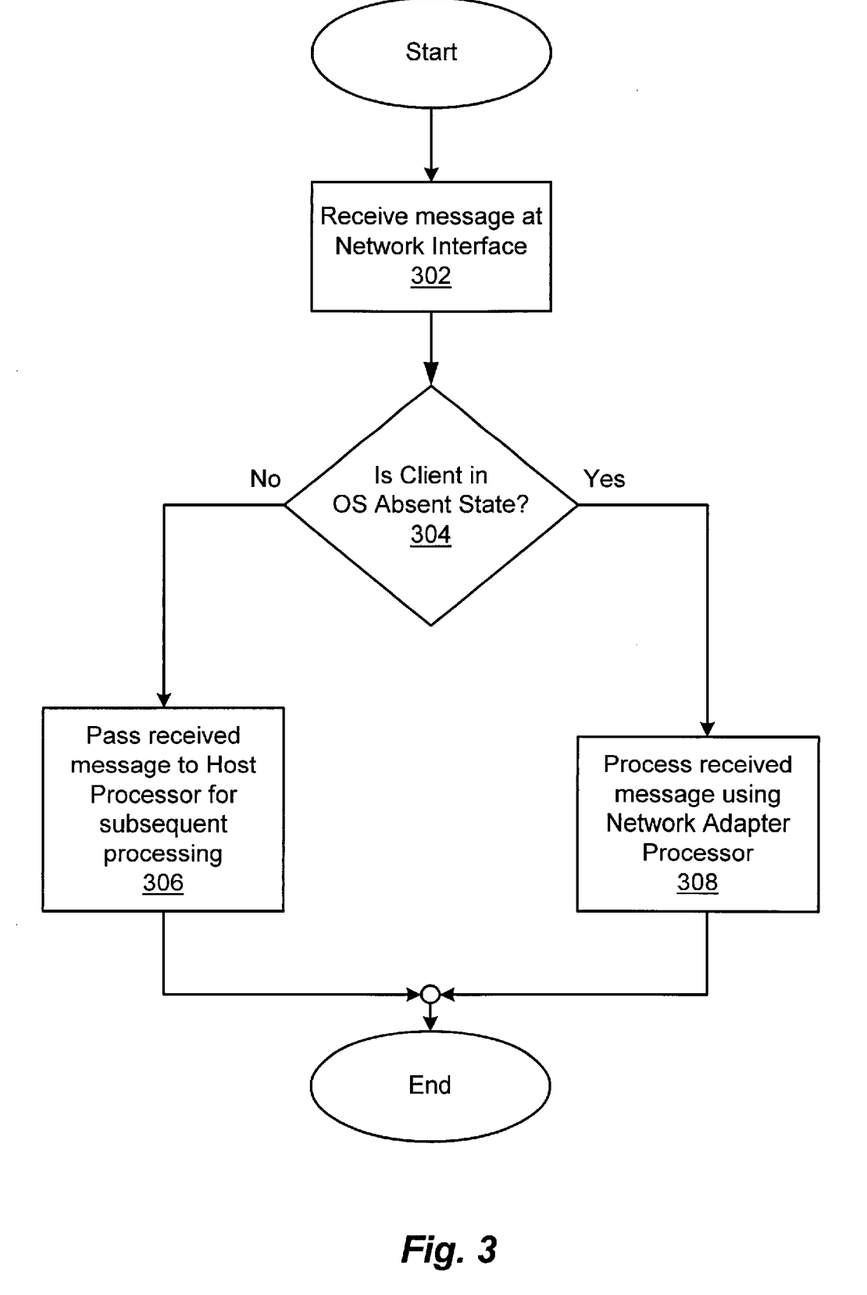
FIG. 3 is a flow diagram illustrating a method of operation of the client computer depicted in FIG. 2 for receiving and processing data packets when the computer is in the low-power state.

A method of responding to a message received at the network interface 216 of the network adapter 206 included in the client 102 is illustrated by reference to FIG. 3. As depicted in step 302, a message is received at the network interface 216 of the network adapter 206. For example, that message may comprise an ARP request message transmitted by a computer on the network 100. Next, as depicted in step 304, a decision is made using the network adapter processor 212 as to whether the client 102 is in the OS absent state (the client 102 is sleeping). It should be understood that if it is determined that the client 102 is not in the OS absent state, then the client 102 is in the OS present state (the client 102 is awake). If it is determined that the client 102 is awake, then the network adapter 206 passes the received message on to the host processor 202 for subsequent processing, as depicted in step 306. For example, if the received message were the ARP request message, then the host processor 202 would generate an ARP reply message and broadcast the generated message over the network 100. Otherwise, if it is determined that the client 102 is sleeping, then the network adapter processor 212 processes the received message, as depicted in step 308. For example, the network adapter processor 212 may generate the ARP reply message and broadcast the generated message over the network 100 without waking the client 102.

Figure 4:
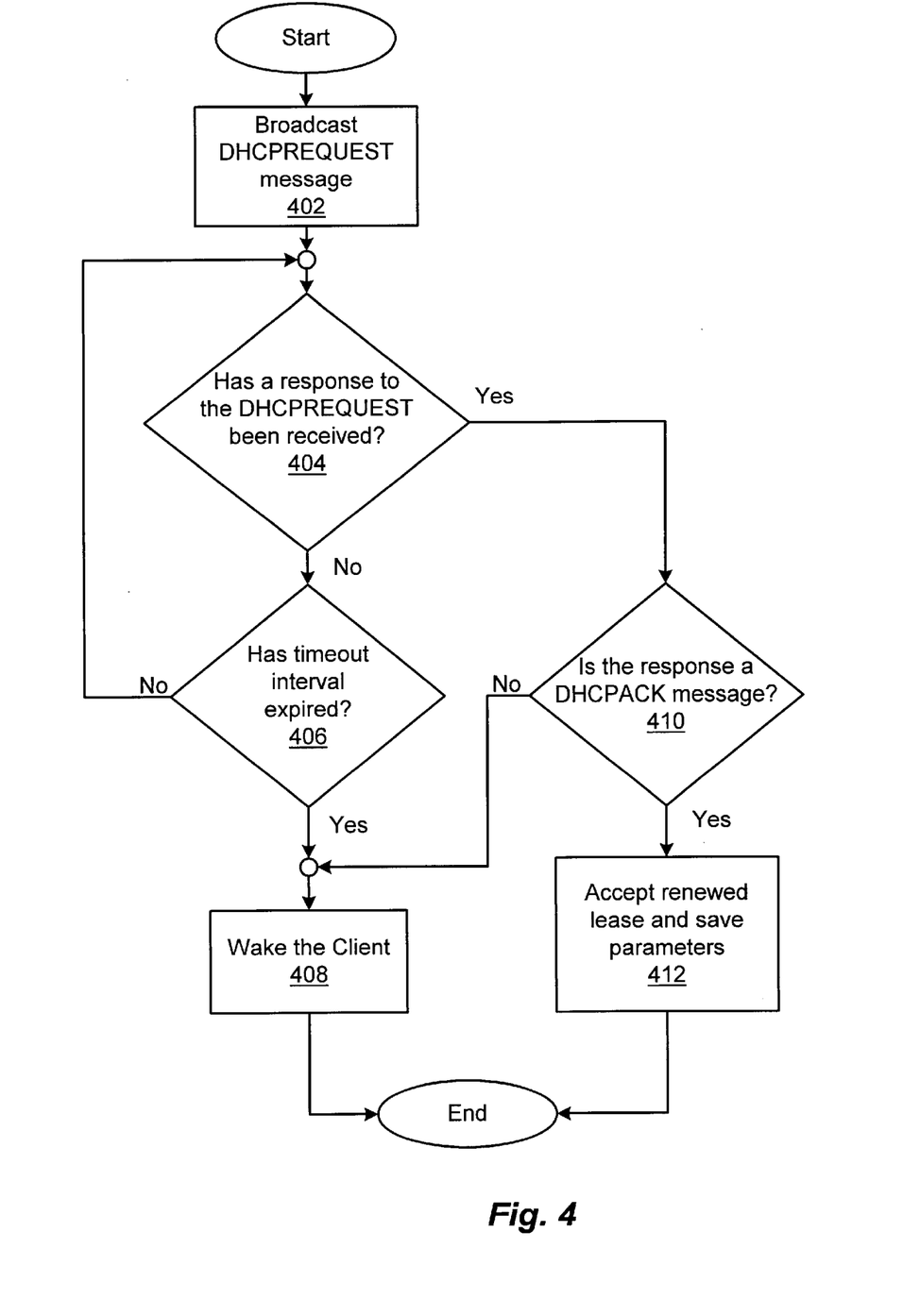
FIG. 4 is a flow diagram illustrating a method of operation of the client computer depicted in FIG. 2 for renewing the lease of an IP address when the computer is in the low-power state.

A method of renewing an IP address lease of the client 102 in the OS absent state (the client 102 is sleeping) is illustrated by reference to FIG. 4. As depicted in step 402, the network adapter 206 generates and broadcasts a DHCPREQUEST message over the network 100 using the network adapter processor 212. Next, as depicted in step 404, a decision is made as to whether a response to the DHCPREQUEST message has been received at the network interface 216. For example, that response may comprise a DHCPNACK message informing the client 102 that the IP address lease cannot be renewed, or a DHCPACK message informing the client 102 that the IP address lease has been successfully renewed. If a response has not yet been received at the network interface 216, then a decision is made, as depicted in step 406, as to whether a timeout interval has expired. If so, then the network adapter 206 wakes the client 102, as depicted in step 408, to allow the host processor 202 to resolve the problem. Otherwise, the method loops back to step 404 to determine again whether a response has been received at the network interface 216. If a response is received at the network interface 216, then a decision is made, as depicted in step 410, as to whether the response is the DHCPACK message. If so, then the network adapter 206 accepts the renewed lease included with the received DHCPACK message using the network adapter processor 212, as depicted in step 412, and saves corresponding lease parameters in the network adapter memory 214. Otherwise, the network adapter 206 wakes the client 102, as depicted in step 408, to allow the host processor 202 to resolve the problem.

Although functions of this illustrative embodiment are illustrated as being software-driven and executable out of the memory 214 by the network adapter processor 212, the presently described functions may alternatively be embodied in part or in whole using hardware components such as custom or semi-custom integrated circuits including Application Specific Integrated Circuits (ASICs), Programmable Logic Arrays (PLAs), state machines, controllers or other hardware components or devices, or a combination of hardware components and software.

Those of ordinary skill in the art should further appreciate that variations to and modification of the above-described systems and techniques may be made without departing from the inventive concepts disclosed herein. Accordingly, the present invention should be viewed as limited solely by the scope and spirit of the appended claims.

What is claimed is:

1. An apparatus for responding to at least one message received over a communications link at a network interface of a network interface adapter, wherein the network interface adapter is communicably coupled to a host computer including a host processor executing an operating system out of a memory and having a host operating system present state in which the operating system is operational and a host operating system absent state in which the host operating system is not operational, the apparatus comprising:

a network adapter processor operative to detect the receipt of the at least one message at the network interface, to determine whether the host computer is in the host operating system present state or the host operating system absent state, in the event the host computer is in the host operating system present state, to forward the at least one message to the host computer for handling by the host processor, in the event the host computer is in the host operating system absent state and the at least one message comprises a first message of a first type, to transmit a first signal to the host processor to transition the host processor from the host operating system absent state to the host operating system present state, and to forward the first message to the host computer for handling by the host processor, and in the event the host computer is in the host operating system absent state and the at least one message comprises a second message of a second type, to generate a response to the second message and to transmit the response via the network interface over the communications link.

2. The apparatus of claim 1 further including a timer operative to transmit a second signal to the network adapter processor at a predetermined time, and the network adapter processor being operative in response to the detection of the second signal, in the event the host computer is in the host operating system absent state, to transmit third signal to the host processor to transition the host processor from the host operating system absent state to the host operating system present state, and to forward the at least one message to the host computer for handling by the host processor.

3. A method of responding to at least one message received at a network interface of a network adapter communicably coupled to a host computer having a host processor operative to execute a host operating system out of a memory and having a host operating system present state in which the operating system is operational and a host operating system absent state in which the host operating system is not operational, the method comprising the steps of:

receiving at the network interface the at least one message;

determining by a processor associated with the network adapter whether the host computer is in the host operating system present state or the host operating system absent state;

in the event the host computer is in the host operating system present state, forwarding the at least one message to the host computer by the network adapter processor for handling by the host processor;

in the event the host computer is in the host operating system absent state and the at least one message comprises a first message of a first type, transmitting a first signal to the host processor by the network adapter processor to transition the host processor from the host operating system absent state to the host operating system present state, and forwarding the first message to the host computer by the network adapter processor for handling by the host processor; and in the event the host computer is in the host operating system absent state and the at least one message comprises a second message of a second type, generating a response to the second message using the network adapter processor, and transmitting the response via the network interface by the network adapter processor.

4. The method of claim 3 wherein the step of receiving includes receiving at the network interface a first directed packet for use in determining whether the host computer is reachable, and the step of generating includes generating a response to the first directed packet using the network adapter processor.

5. The method of claim 3 wherein the step of receiving includes receiving at the network interface a first broadcast packet for use in determining an address corresponding to the host computer, and the step of generating includes generating a response to the first broadcast packet using the network adapter processor.

6. A method of transmitting at least one predetermined message via a network interface of a network adapter communicably coupled to a host computer having a host processor operative to execute a host operating system out of a memory and having a host operating system present state in which the operating system is operational and a host operating system absent state in which the host operating system is not operational, the method comprising the steps of:

in response to a predetermined event, determining by a processor associated with the network adapter whether the host computer is in the host operating system present state or the host operating system absent state;

in the event it is determined by the network adapter processor that the host computer is in the host operating system absent state, generating the at least one predetermined message using the network adapter processor; and transmitting the at least one predetermined message via the network interface.

7. The method of claim 6 wherein the step of generating includes generating a first packet having source and destination addresses set to a machine address of the network adapter using the network adapter processor, and wherein the step of transmitting includes periodically broadcasting the first packet via the network interface.

8. The method of claim 6 wherein the step of generating includes generating a first packet for use in renewing an address lease associated with the host computer using the network adapter processor, and wherein the step of transmitting includes broadcasting the first packet via the network interface.

9. A method of waking a host computer, the host computer having a host processor operative to execute a host operating system out of a memory and having a host operating system present state in which the operating system is operational and a host operating system absent state in which the host operating system is not operational, the host computer being communicably coupled to a network adapter, the method comprising the steps of:

determining by a processor associated with the network adapter whether the host computer is in the host operating system present state or the host operating system absent state; and in the event it is determined by the network adapter processor that the host computer is in the host operating system absent state, transmitting a signal to the host processor at a predetermined time using the network adapter processor to transition the host processor from the host operating system absent state to the host operating system present state.

10. The method of claim 9 wherein the predetermined time corresponds to an end of a predetermined time interval.

* * * * *

UNITED STATES PATENT AND TRADEMARK OFFICE
CERTIFICATE OF CORRECTION

PATENT NO.   : 6,681,244 B1
DATED        : January 20, 2004
INVENTOR(S)  : Patricia C. Cross et al.

It is certified that error appears in the above-identified patent and that said Letters Patent is hereby corrected as shown below:

Column 13,
Line 12, "transmit third" should read -- transmit a third --.

Signed and Sealed this

Ninth Day of November, 2004

JON W. DUDAS
*Director of the United States Patent and Trademark Office*